(12) United States Patent
Fenton

(10) Patent No.: US 8,638,257 B2
(45) Date of Patent: Jan. 28, 2014

(54) ULTRA SHORT BASELINE GNSS RECEIVER

(75) Inventor: Patrick C. Fenton, Calgary (CA)

(73) Assignee: Novatel, Inc., Calgary (CA)

( * ) Notice: Subject to any disclaimer, the term of this patent is extended or adjusted under 35 U.S.C. 154(b) by 287 days.

(21) Appl. No.: 12/579,460

(22) Filed: Oct. 15, 2009

(65) Prior Publication Data

US 2011/0090114 A1   Apr. 21, 2011

(51) Int. Cl.
*G01S 19/54* (2010.01)
*G01S 19/53* (2010.01)

(52) U.S. Cl.
USPC .............................. 342/357.37; 342/357.36

(58) Field of Classification Search
USPC ........................ 342/357.36, 357.37
See application file for complete search history.

(56) References Cited

U.S. PATENT DOCUMENTS

| | | | |
|---|---|---|---|
| 4,719,469 A * | 1/1988 | Beier et al. ..................... | 342/434 |
| 5,101,356 A | 3/1992 | Timothy et al. | |
| 5,446,465 A | 8/1995 | Diefes et al. | |
| 5,506,588 A | 4/1996 | Diefes et al. | |
| 5,534,875 A * | 7/1996 | Diefes et al. ............. | 342/357.59 |
| 6,005,514 A * | 12/1999 | Lightsey ....................... | 342/365 |
| 6,023,240 A * | 2/2000 | Sutton ....................... | 342/357.37 |
| 6,088,653 A * | 7/2000 | Sheikh et al. ................. | 701/214 |
| 6,211,821 B1 | 4/2001 | Ford | |
| 6,441,779 B1 | 8/2002 | Bennett et al. | |
| 6,677,885 B1 * | 1/2004 | Frankot ....................... | 342/25 R |
| 7,298,325 B2 | 11/2007 | Kriikorian et al. | |
| 7,358,893 B2 | 4/2008 | O'Brien | |
| 2002/0165669 A1 | 11/2002 | Pinto et al. | |
| 2006/0012516 A1 * | 1/2006 | Ford et al. ................ | 342/357.04 |
| 2009/0164067 A1 | 6/2009 | Whitehead et al. | |

FOREIGN PATENT DOCUMENTS

WO   WO 2006/026016   3/2006

OTHER PUBLICATIONS

Comp, C. et al., "Adaptive SNR-Based Carrier Phase Multipath Mitigation Technique," IEEE Trans. on Aerospace and Electronic Systems, vol. 34, No. 1, Jan. 1998, pp. 264-276.
Sutton, Eric. "Calibration of Differential Phase Map Compensation Using Single Axis Rotation," Proc. of the 11 Int'l Tech. Meeting of the Satellite Division of ION, Sep. 1998, pp. 1-16.
Kim, Ung Suok et al. "Precise Phase Calibration of a Controlled Reception Pattern GPS Antenna for JPALS," IEEE PLANS 04, 2004, 9 pages.
Kim, Ung Suok et al. "Phase Effects Analysis of Patch Antenna CRPAs for JPALS," ION GNSS $17^{th}$ Int'l Tech. Meeting of the Satellite Division, Sep. 2004, pp. 1531-1538.
Gebre-Egziabher D. et al.: "A Low-Cost GPS/inertial Attitude Heading Reference System (AHRS) for General Aviation Applications", Position Location and Navigation Symposium, IEEE 1998 Palm Springs, CA, USA Apr. 20-23, 1993, New York, NY, USA, IEEE, US, Apr. 20, 1998, pp. 518-525.

* cited by examiner

*Primary Examiner* — Cassie Galt
(74) *Attorney, Agent, or Firm* — Cesari and McKenna, LLP

(57) ABSTRACT

A GNSS receiver utilizes an antenna structure that two or more antennas that are spaced apart from their neighboring antennas by less than 1 wavelength of a GNSS satellite carrier signal of interest. The receiver calculates the orientation of the antennas directly from differences in the carrier phase angles measured at the two antennas, without resolving integer carrier cycle ambiguity.

17 Claims, 3 Drawing Sheets

ULTRA SHORT BASELINE GNSS RECEIVER

BACKGROUND OF THE INVENTION

1. Field of the Invention

This invention relates generally to global navigation satellite systems (GNSS) and more particularly to short baseline receivers.

2. Background Information

Short baseline real time kinematic (RTK) systems typically operate with a base GNSS receiver and a rover GNSS receiver that are separated by a small number of kilometers, for example, less than 10 kilometers. The base receiver, which is in a known position, makes carrier phase measurements using GNSS signals transmitted from GNSS satellites in view and calculates pseudoranges from the respective satellites. The base receiver then determines differences between the pseudoranges calculated using the satellite signals and the ranges based on the known position of the receiver and the known locations of the satellites, to determine pseudorange correction information. The base receiver operating in a known manner broadcasts the RTK information, that is, the range correction information, pseudoranges, carrier phase measurements and various other information, to the rover receiver.

The rover receiver utilizes the broadcast pseudoranges, carrier phase measurements and other information to resolve integer carrier cycle ambiguities using well known, processing intensive, operations. The rover receiver utilizes the range correction information to correct for pseudorange errors related to changes in satellite orbits, atmospheric conditions, and so forth, that affect both the base receiver and the rover receiver in the same manner due to the short baseline between the receivers, all in a known manner.

Certain short baseline systems utilize fixed baselines that may, for example, employ two antennas situated at the rover receiver to determine the orientation or azimuth of the rover receiver. The antennas may be fixed to a vehicle, such as an automobile or a ship, and may, for example, be spaced apart by as little as 1 to ½ meter. Each antennas provides information that is utilized in well known short baseline RTK processing-intensive operations, to simplify the calculations involved in resolving the integer carrier cycle ambiguities for the respective antennas. Once integer carrier cycle ambiguities are resolved, the system can determine the azimuth or orientation of the vehicle based on the differences in the carrier phases measured at the two antennas.

As is well known in the art, the short fixed baseline essentially reduces the complexity of resolving integer cycle ambiguities by changing the solutions from those of a 3-dimensional problem to those of a 2-dimensional problem. However, the system must still engage in processing intensive and time consuming operations to solve the 2-dimensional problem.

SUMMARY

A GNSS receiver utilizes an antenna structure in which two antennas are spaced apart by less than one wavelength of the GNSS satellite carrier signals of interest. The receiver calculates azimuth or orientation using the carrier phase angle measurements from the antennas directly, without having to engage in the processing-intensive operations of resolving integer carrier cycle ambiguities.

Without having to resolve the ambiguities, the receiver calculates the orientation more quickly, and can thus initialize inertial sensors, such as gyroscopes, relatively rapidly during start-up and/or after signal re-acquisition. Also, the orientation information calculated directly from the carrier phase angle measurements made by the closely spaced antennas has zero mean error, and may thus be utilized to maintain the calibration of the gyroscopes. Accordingly, less expensive gyroscopes may be used without adversely affecting the overall operations of the system.

The ultra-short baseline GNSS receiver may utilize a phase map as described in U.S. patent application Ser. No. 12/579,481 entitled SHORT AND ULTRA-SHORT BASELINE PHASE MAPS and identified by Cesari and McKenna, which is filed on even date herewith, assigned to a common Assignee and incorporated herein by reference in its entirety. The phase map provides compensation for phase distortions that are related to multipath signals, antenna cross-talk, and line biases that are associated with receiver operations, as discussed in more detail below.

BRIEF DESCRIPTION OF THE DRAWINGS

The present invention can be better understood with reference to the accompanying drawings, of which.

DETAILED DESCRIPTION OF AN ILLUSTRATIVE EMBODIMENT

Figure 1:
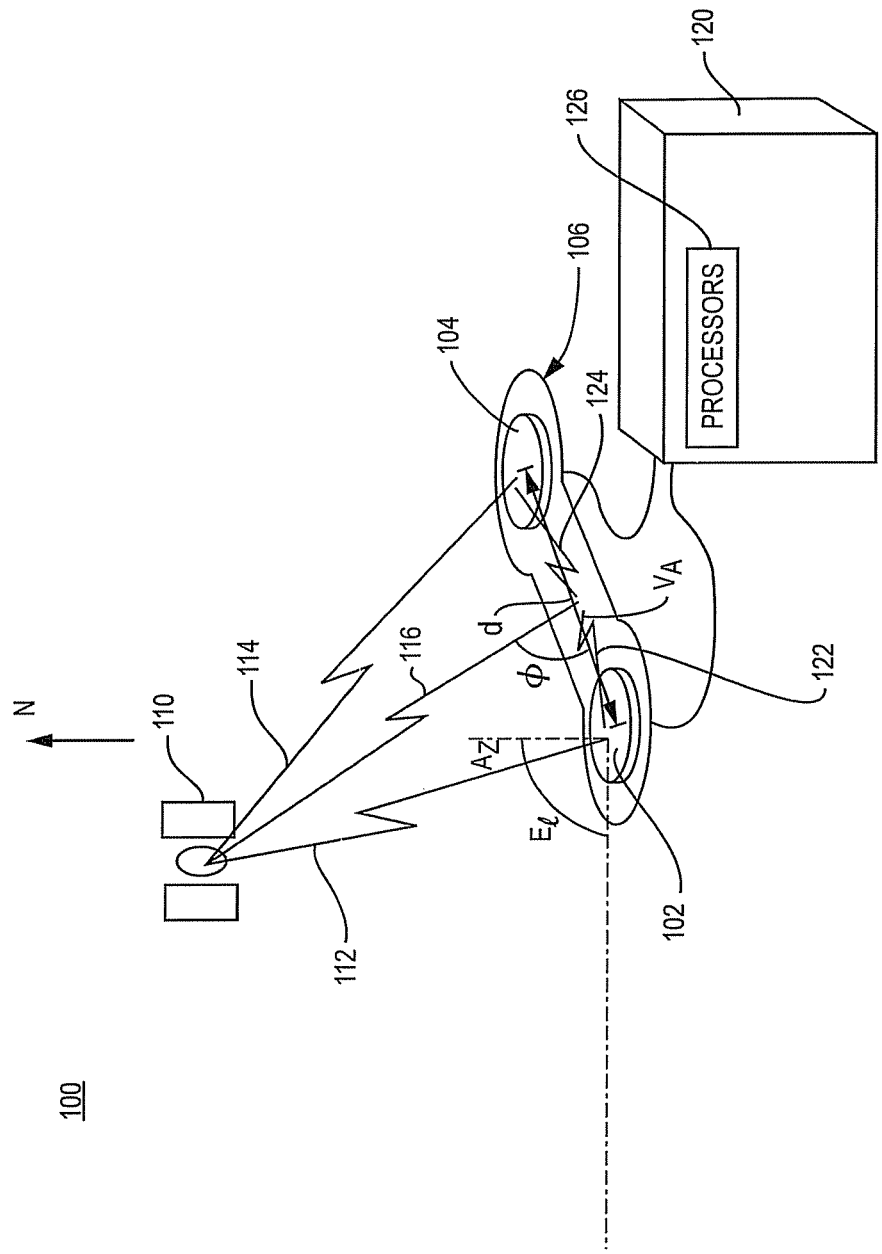
FIG. 1 is a schematic illustration of an ultra-short baseline GNSS receiver constructed in accordance with the invention.

FIG. 1 is a schematic illustration of an ultra-short baseline system 100 that receives GNSS satellite signals transmitted by a GNSS satellite 110. More specifically, the system 100 of FIG. 1 includes an antenna structure 106106 that consists of dual antennas 102 and 104 that are mounted on a rigid frame 106 and a receiver 120 with one or more processors 126 that processes the signals received by the antennas. The antennas reside a distance "d" apart, where d is constrained to be less than 1 wavelength of the GNSS satellite carrier signals of interest. The spacing d may, for example, be less than 19 cm for a system that operates with GPS L1 satellite carrier signals.

The signals from the GNSS satellite 110 are represented schematically as signal path 112, which is received by antenna 102, and signal path 114, which is received by antenna 104. The lengths of the two paths differ because of the different locations of the respective antennas. The signals received by the dual antennas 102 and 104 are provided to the accompanying receiver equipment 120, which includes one more process 126 that are programmed to calculate the orientation of the antennas in the manner described below.

By designing the antenna structure 106 with the antennas 102, 104 located within 1 wavelength of the carrier signal, the system may determine orientation without reference to integer carrier cycle ambiguities because the ambiguities are the same for the two antennas and thus do not affect the calculations. Accordingly, the measured phase angles can be used directly to calculate the carrier phase difference from which the azimuth or orientation is determined, without having first perform the processing and take the time to resolve integer carrier cycle ambiguities.

There are, however, geometries in which the angle of incidence of the incoming satellite signals results in a "roll over"

from one carrier cycle to another between the antennas, and thus, some ambiguity as to which direction corresponds to the phase angle at a given antenna, i.e., whether the phase angle rotation is plus or minus relative to zero degrees. However, the calculations involving signals received from other GNSS satellites that are not then at similar sky locations provides sufficient information to allow the receiver to determine the correct, i.e., plus or minus, phase angle rotation, and thus compensate for cycle roll over, To calculate the orientation of the antenna 102, 104, the receiver 120 determines its position in a known manner and with sufficient accuracy to utilize the satellite broadcast data to determine the positions of GNSS satellites in view. The receiver then measures the carrier phase angles of the incoming GNSS satellite signals at the two antennas and subtracts the angles to produce a measured carrier phase angle difference. The receiver then uses the measured carrier phase angle difference directly in the well known calculations to determine orientation from phase difference measurements. As an example, the receiver may calculate orientation as:

$$d\sigma = \frac{L\cos\varphi}{\lambda} + B_L$$

where $d\sigma$ is the expected phase angle difference, $\lambda$ is the wavelength of the GNSS carrier signal, L is the distance between the antenna phase centers, $\varphi$ is the angle between vector $V_A$ and the incoming satellite signal, and $B_L$ is the RF electrical line bias between the circuitry associated with the respective antennas.

Assuming the approximate location of the closely-spaced antennas can be determined, the direction of the incoming GNSS satellite signal can be ascertained from the broadcast data on the satellite signal. The $\cos \varphi$ term of eqn. 1 can then be calculated using the cosine dot product:

$$\cos \varphi = ax + by + cz$$

where (ai+bj+ck) is the unit vector of the incoming signal from the GNS satellite signal, and (xi+yj+zk) is the unit vector of the vector $V_A$ that join the antenna phase centers.

In the calculation, $$a = \cos(Az_s)\cos(El_s)$$

$$b = \sin(Az_s)\cos(El_s)$$

$$c = \sin(El_s)$$

where the subscript "s" indicates the angles are with respect to the satellite signal and Az and El represent azimuth with respect to North and elevation angle with respect to the horizon, respectively. Further:

$$x = \cos(Az_A)\cos(El_A)$$

$$y = \sin(Az_A)\cos(El_A)$$

$$z = \sin(El_A)$$

where the subscript "A" indicates the angles are with respect to the vector $V_A$. As will be appreciated, other known calculations may be used to determine the angle of incidence between the incoming satellite signal and the vector $V_A$ based on the known position of the GNSS satellite and the known or an estimated orientation of the antenna baseline.

The line bias $B_L$ is common to all GNSS signals received by the two antennas. Accordingly, the line bias can be determined by, for example, adjusting the carrier phase differences to remove or essentially equate the geometries for various incoming satellite signals, such that the line bias term is the same across the calculations. Alternatively, the line bias may be determined from measurements taken when a given satellite is positioned at a 90 degree angle with respect to the vector $V_A$, which is when the carrier phase difference should otherwise be zero. Alternatively, pairs of phase difference measurements could be differenced, to produce double-difference phase observations in which the common line bias term cancels. With the antenna spacing constrained to less than one wavelength of the carrier signal, the receiver avoids the processing-intensive calculations to resolve integer carrier ambiguities before determining orientation, as is required for known prior systems that utilize antennas with conventional spacing and must use calculated carrier phase values for the signals at the respective antennas.

In addition to the reduction in processing complexity, the antenna structure 106 has further advantages over structures with conventional antenna spacing of 1 or ½ meter. For example, the antenna structure 106 is less costly to manufacture, utilizes less material, and so forth. Further, the antenna structure may be placed in locations on, for example, a car or other vehicle, that would not support larger antenna structures.

The disadvantage of the short base line is reduced accuracy, with the accuracy of the computed orientation being inversely proportional to the baseline length d.

Figure 2:
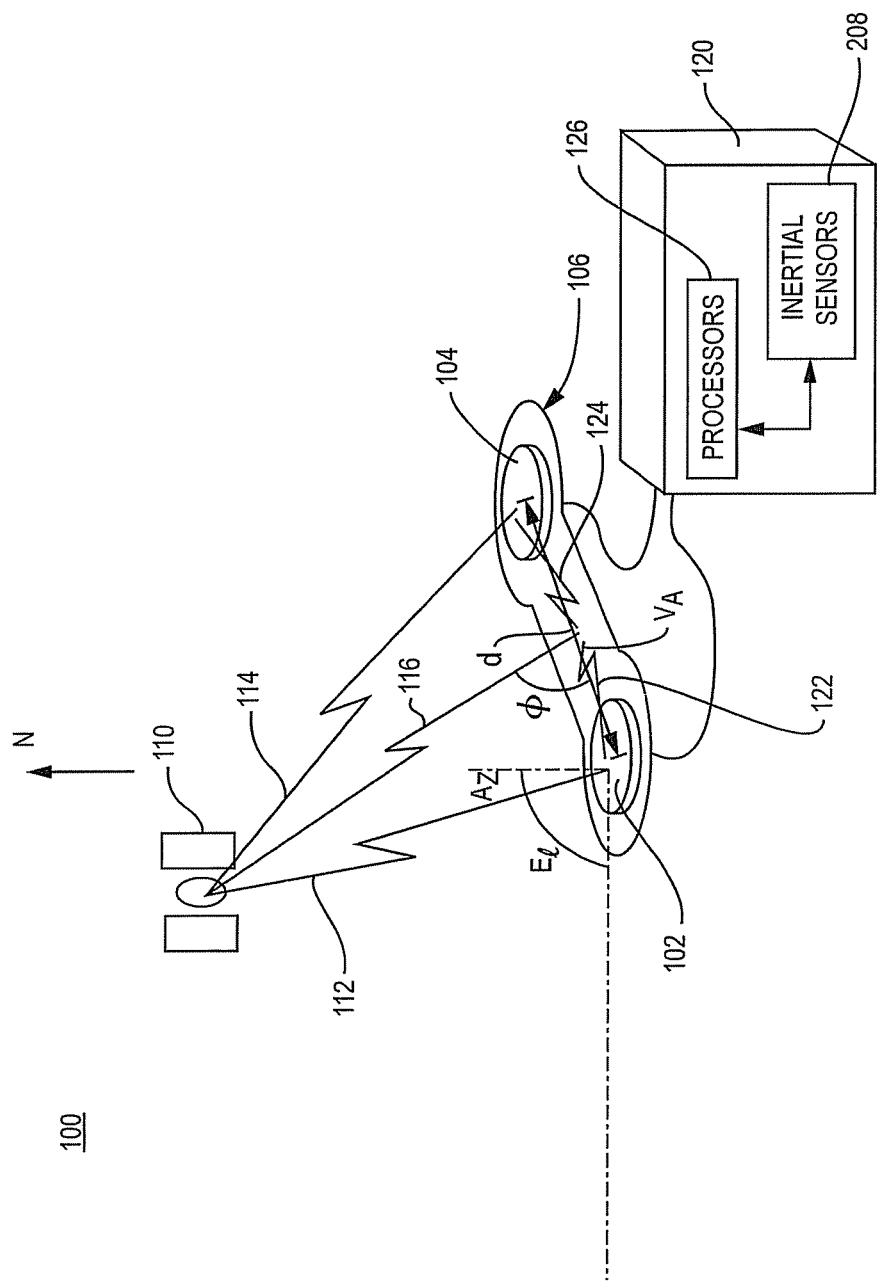
FIG. 2 is a schematic illustration of an alternative ultra-short baseline GNSS receiver constructed in accordance with the invention.

Referring now to FIG. 2, a receiver 220 that incorporates the ultra-short baseline antenna structure 106 also includes inertial sensors 208, such as, for example, gyroscopes. The use of the ultra-short baseline antenna structure 106 allows the system to initialize the gyroscopes more quickly than prior known systems, because the receiver need not resolve carrier cycle ambiguities to determine azimuth or orientation. Accordingly, the receiver can take advantage of the gyroscope readings to provide updated direction information more quickly during start-up, as well as during times in which the receiver is reacquiring the GNSS satellite signals after signal lock is lost. This is particularly useful in applications designed for a moving vehicle that may, for example, travel under bridges or foliage canopies or through urban canyons.

Further, the orientation information calculated using the measured carrier phase angles directly is calculated with zero mean error, and thus, the orientation information may be used to maintain the calibration of the gyroscopes, such that less expensive gyroscopes may be used without adversely affecting the operations of the receiver.

Figure 3:
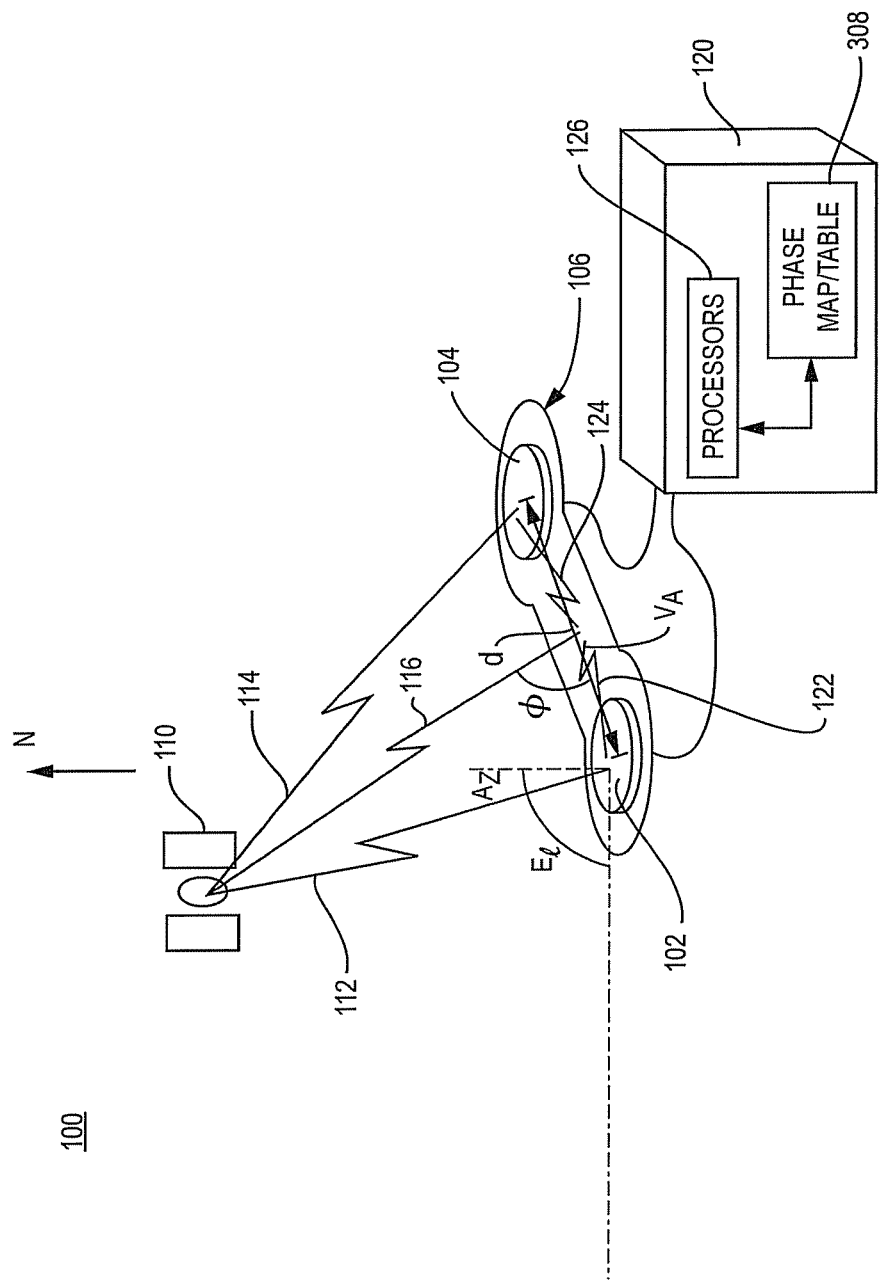
FIG. 3 is a schematic illustration of another ultra-short baseline GNSS receiver constructed in accordance with the invention.

Referring now to FIG. 3, a receiver 300, which may be the same as either the receiver 120 (FIG. 1) of the receiver 220 (FIG. 2) discussed above, is included in a system 300 in which a phase map 308 is utilized to provide carrier phase difference error values. The error values are incorporated into the calculations to determine azimuth or orientation, to correct for the adverse effects of multipath signals that are reflected from the antenna frame 106 to the antennas 102, 104 and, as appropriate, line biases that are associated with the operations of the receiver. The phase map also corrects for the adverse affects of cross-talk between the two closely spaced antennas 102, 104, as appropriate. The cross-talk may result in calculations that tend to shift the phase centers of the antennas slightly toward each other, and thus, result in errors in the associated calculated azimuth or orientation values.

The phase map 308 is generated as described in the incorporated co-pending application entitled SHORT AND ULTRA-SHORT BASELINE PHASE MAPS. The ultra-short baseline phase map for use with the antenna structure 106 may thus be generated from carrier phase angle measurements made at various times across GNSS satellites with the antenna structure in known locations and orientations. As necessary, the receiver may solve for the associated line biases using the measurements from multiple GNSS satellites or the measurements from the same satellite taken at various times and/or at the sky location in which the carrier phase angle difference at the antennas should otherwise be zero. The phase map is entered based on the angles of incidence of the GNSS satellite signals at the antennas, as is described in the incorporated application.

To utilize the phase map 308, the receiver 320 determines its position and determines from satellite broadcast data or is provided with the position coordinates of a given GNSS satellite in view. The receiver calculates an estimated orientation of the antenna structure 106 based on measured carrier phase angle differences in the signals received at the two antennas 102, 104. As discussed above, the measured carrier phase angles are used directly to determine the carrier phase difference, without having to resolve integer carrier cycle ambiguities.

The receiver next calculates the angle of incidence of the incoming GNSS signals based on the known position of the GNSS satellite and the estimated orientation of the antennas. Using the calculated angle of incidence, the receiver enters the phase map 308, which may be in the form of a look-up table, and retrieves an associated carrier phase difference error value. The error value is used in the azimuth or orientation calculations to compensate for phase distortions. In the example, the receiver utilizes the error value as a correction to the measured phase difference, and produces an updated orientation value by using corrected phase difference measurements. As appropriate, the receiver iterates by recalculating the angle of incidence based on the updated orientation value and again enters the map, and so forth, until a change in the updated orientation value is less than the error gradient associated with the map or table entries.

As discussed, the receiver may utilize the orientation information to initialize gyroscopes and/or determine the direction of a moving vehicle. At the same time or thereafter, the receiver may operate in a known manner, using RTK information from a base station (not shown) and RTK short baseline techniques, to resolve the integer carrier cycle ambiguity using the measurements from one of the antennas 102, 104, in order to determine a more precise position over the short baseline, which is greater than 1 wavelength of the GNSS carrier signal. The orientation information is used to initialize the carrier cycle ambiguity resolution processes utilized as part of the RTK short baseline calculations. Alternatively or in addition, the orientation information may be used with pairs of antennas arranged in corresponding longer baselines, to initialize associated carrier cycle ambiguity resolution processes. The corresponding longer baselines may, but need not, include antennas in the antenna structure as baseline end points. Alternatively, or in addition, the receivers may operate in a system that includes a data collection and processing center (not shown), and the receivers may send the carrier phase angle measurement data to the processing center for position and/or orientation determination. The receivers may thus be less complex since they need not process the measurement data. In such a system, the processing center may collect the carrier phase angle measurements and batch process the data to determine which carrier phase angle measurements are valid in the manner set forth in co-pending United State Patent Application Publication No. 2006/0012516 entitled METHOD FOR POSITIONING USING GPS IN A RESTRICTIVE COVERAGE ENVIRONMENT, which is assigned to a common Assignee and incorporated herein in its entirety by reference. The system then uses only the valid carrier phase angle measurements to calculate orientation. Alternatively, the processing center may calculate orientation using each set of carrier phase angle measurement data collected when, for example, the antennas are located on a moving vehicle.

The antenna structure 106 may include additional antennas (not shown). Each of the antennas or at least certain pairs of the antennas are spaced apart by less than one wavelength of the GNSS signal of interest. Accordingly, all of the antennas may but need not be equally spaced from one another. With more than two antennas, the receiver 120, 220, 320 may determine the three dimensional orientation of the antenna structure using all or selected pairs of the antennas in a manner similar to that described above for two dimensions.

Alternatively or in addition, the pitch and yaw of the antenna structure may, for example, be determined in a manner described in U.S. Pat. No. 6,211,821 B1 entitled Apparatus and Method for Determining Pitch and Azimuth From Satellite Signals, which is incorporated herein in its entirety by reference. However, the carrier cycle ambiguity resolution is not performed, rather cycle roll over compensation is performed for the ultra-short baselines, as discussed above.

The foregoing description has been directed to specific embodiments of the invention. It will be apparent, however, that other variations and modifications, such as combining system components such as processors with a single component or separating the processor into additional components, performing certain or all of the processing operations in software, hardware or firmware, performing certain processing operations at a processing center and other processing operations at a receiver, performing steps out of order, and so forth, may be made to the described embodiments, with the attainment of some or all of the advantages of such. Accordingly, this description is to be taken only by way of example and not to otherwise limit the scope of the invention. Therefore, it is the object of the appended claims to cover all such variations and modifications as come within the true spirit and scope of the invention.

What is claimed is:

1. A GNSS receiver comprising:
    an antenna structure consisting of two or more antennas with each antenna spaced apart from neighboring antennas by less than one wavelength of a carrier signal in GNSS satellite signals;
    a phase map that contains carrier phase difference error values associated with angles of incidence of the GNSS satellite signals at the antenna structure and line biases associated with operation of the GNSS receiver and calculated for respective pairs of antennas based on phase difference values;
    one or more processors configured to process the GNSS satellite signals received by the antennas and calculate estimated orientation of the antenna structure directly from differences in carrier phase angle measurements of incoming GNSS carrier signals at the antennas, determine the angles of incidence of the respective GNSS satellite signals based on positions of respective satellites and the estimated orientation of the antenna structure, enter the phase map using the angles of incidence and retrieve associated carrier phase difference error values, and utilize the associated carrier phase difference error values to correct the estimated orientation to produce an updated orientation; and
    the one or more processors further configured to re-enter the phase map to calculate a new updated orientation, utilizing updated angles of incidence, until a change in the new updated orientation is less than an error gradient associated with the phase map.

2. The GNSS receiver of claim 1 wherein the one or more processors are configured to calculate the estimated orientation of the antenna structure without resolving an integer carrier cycle ambiguity of the incoming GNSS carrier signals, and perform cycle roll over compensation as needed.

3. The GNSS receiver of claim 2 further including:
one or more inertial sensors that are initialized with the estimated calculated orientation, the sensors providing sensor values to the one or more processors, and
the one or more processors are configured to include the sensor values in calculations that determine direction of movement.

4. The receiver of claim 3 wherein the one or more inertial sensors are gyroscopes.

5. The receiver of claim 4 wherein the one or more processors are configured to utilize the calculated estimated orientation to calibrate the one or more gyroscopes.

6. The receiver of claim 1 wherein the one or more processors are configured to calculate the estimated orientation in two dimensions if the antenna structure includes two antennas and in three dimensions if the antenna structure includes more than two antennas.

7. A method of operating a GNSS receiver comprising:
receiving incoming GNSS signals at two or more antennas on an antenna structure, each antenna being spaced apart from at least one neighboring antenna by an ultra short baseline that is less than one wavelength of a carrier of the GNSS signals,
measuring carrier phase angles of the GNSS signals at the antennas and calculating one or more carrier phase differences directly from the carrier phase angle measurements,
calculating estimated orientation of the antennas from the carrier phase differences,
using the calculated estimated orientation and a position of a satellite to determine angles of incidence of incoming GNSS signals,
using the angles of incidence to enter a phase map or table to retrieve associated carrier phase difference error values that include line biases associated with operation of the GNSS receiver and calculated for respective pairs of antennas based on phase difference values,
correcting the calculated carrier phase differences based on the carrier phase difference error values,
correcting the estimated orientation based on the corrected phase differences to produce an updated orientation, and
re-entering the phase map, utilizing updated angles of incidence, to retrieve the associated carrier phase difference error values to calculate a new updated orientation until a change in the new updated orientation is less than an error gradient associated with the phase map.

8. The method of claim 7 wherein calculating the estimated orientation is performed without resolving integer carrier cycle ambiguity and with roll over compensation as needed.

9. The method of claim 7 further comprising:
collecting carrier phase angle measurement data over a period of time,
batch processing the carrier phase angle measurement data to determine which carrier phase angle measurement data are valid, and
calculating the estimated orientation of the antennas using the valid carrier phase measurement data.

10. The method in claim 7 further comprising:
collecting sets of carrier phase angle measurement data over a period of time, and
computing the estimated orientation of the antenna with each set of collected phase angle measurement data to determine direction.

11. The method of claim 7 further including utilizing the calculated estimated orientation to initialize one or more inertial sensors.

12. The method of claim 11 further including utilizing the estimated calculated orientation to calibrate the inertial sensors.

13. The method of claim 11 further including utilizing the estimated calculated orientation to re-initialize GNSS phase difference tracking processes after signal lock to the GNSS carrier signal is lost and reacquired.

14. The method of claim 7 wherein re-entering the phase map further includes
a) calculating the updated angles of incidence using a latest calculated updated orientation,
b) entering the phase map or table to extract improved estimates of the carrier phase difference error values,
c) using the improved estimates of the phase difference error values to correct the phase difference measurements,
d) calculating the new updated orientation based on the corrected phase difference measurements,
e) repeating steps a through d until the new updated orientation for the iteration is sufficiently close to a previous updated orientation for a previous iteration based on the error gradient of the phase map.

15. The method of claim 7 further including using the estimated orientation calculated for one or more ultra short baselines to initialize the carrier cycle ambiguity resolution of one or more corresponding longer base line pairs of GNSS antennas.

16. The method of claim 15 wherein one endpoint of at least one of the longer base lines is an end point of the corresponding ultra short base line.

17. The method of claim 7 wherein the estimated orientation is determined in two dimensions if the antenna structure includes two antennas and in three dimensions if the antenna structure includes more than two antennas.

* * * * *